June 21, 1960      J. R. LOGAN      2,941,908
ULTRASONIC CLEANING METHOD AND APPARATUS
Filed Aug. 1, 1955
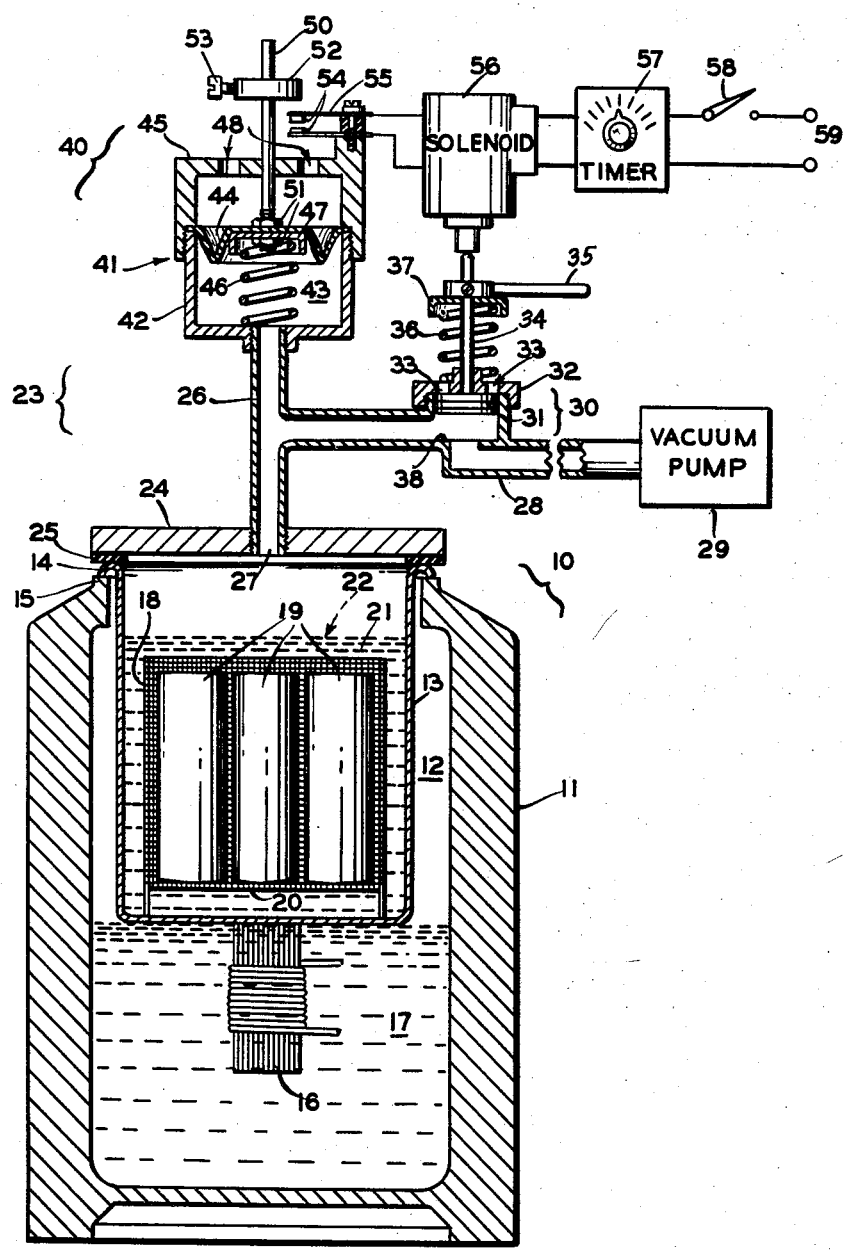
INVENTOR.
JAMES R. LOGAN
BY
ATTORNEY

United States Patent Office 2,941,908
Patented June 21, 1960

2,941,908

ULTRASONIC CLEANING METHOD AND APPARATUS

James R. Logan, Rock Island, Ill., assignor to Bendix Aviation Corporation, Teterboro, N.J., a corporation of Delaware Filed Aug. 1, 1955, Ser. No. 525,488

16 Claims. (Cl. 134—1)

This invention relates to a process for removing contaminants, and especially liquids, from oil well cores, and specifically to a process of this type which utilizes the action of ultrasonic waves.

The possibilities of an oil well depend to a substantial extent on the characteristics of permeable rock formations in the oil-bearing zone; and to determine such characteristics it is necessary to remove from core samples of such rock the oil or salt water with which they are impregnated when first obtained, such liquids being generally classified as contaminants. Since the interstices in the rock are very small, and the cores are of substantial diameter, complete removal of contaminants from the central zones of such cores is difficult. Such removal is generally accomplished by lengthy processing. One common method is to treat the core in a Soxhlet apparatus with a recirculated petroleum solvent, requiring treatment from a minimum of one day for a very permeable sandstone to two weeks for the very slightly permeable types of rock, such as vugular and finely crystalline siliceous carbonates.

An object of the invention is to provide an improved process for removing contaminants from oil well cores, and particularly a process that can be completed in a substantially shorter processing period than prior processes.

A further object is to utilize the action of ultrasonic waves to improve, and especially to accelerate, the removal of contaminants from cores. It has been found that when a core is immersed in a contaminant-extracting liquid and subjected to the action of ultrasonic waves traveling through the liquid, effective removal of the contaminants is greatly accelerated. This is believed to be due, at least in part, to the fact that the waves penetrate to the innermost parts of the core. The wave action on the liquid in the interstices of the core is effective to enable the solvent or other extracting liquid to penetrate even the smallest passages, and tends to counteract the contaminant-retaining tendency caused by the adsorptive attraction of the interior surfaces of the core for the liquid and solids.

Another object is to improve the action of the extracting liquid by changes in pressure. It has been found that when the core is subjected to the action of an extracting liquid under given pressure conditions, and the pressure is periodically reduced, the rate of extraction is increased. This is believed to be due to the fact that the pressure reduction causes liquid in the core under higher pressure to flow out and mix with the body of extracting liquid, carrying with it a substantial amount of liquid and dissolved contaminants, an operation referred to as flushing. When the pressure is thereafter increased, further amounts of the extracting liquid are forced into the core to act on the remaining contaminants. This cyclic operation accelerates the extraction process.

A related object is to accomplish this result by extracting the contaminants under vacuum, and by periodically releasing the vacuum. A more specific purpose is to provide means for automatically releasing the vacuum at appropriate periods. Another purpose is to provide an arrangement for automatically releasing the vacuum when it has reached a selected value. Another object is to provide an automatic cyclic vacuum release system which includes means for maintaining a connection between the container and the zone of higher pressure for a selected period after pressure has risen above the selected vacuum value in order to allow time for the pressure in the container to reach that of the abovementioned zone, such as atmospheric pressure.

A further object is to utilize ultrasonic waves to assist in the effectiveness of the use of periodically changed pressure by improving the discharge of contaminants from the core.

Another object is to reduce objectionable features of processes in which an extracting liquid, and especially an inflammable liquid of the type generally used as an oil solvent, is boiled during extraction, while retaining the substantial advantages of such boiling. This is in general accomplished by boiling primarily through reduction in pressure rather than by the application of heat. A related object is to provide an extracting process, and in particular one in which the extracting liquid is boiled, which includes means for withdrawing vapors volatilized from such liquid, especially when such vapors are inflammable or explosive. This is accomplished by withdrawing such vapors in connection with the reduction in pressure during extraction.

A further object is to provide an arrangement for carrying out said process which is suitable for use with known types of ultrasonic cleaning apparatus. A related object is to provide an attachment which adapts the apparatus for carrying out the process and which may be used with such apparatus without material modification of the latter.

The foregoing and other objects and advantages of the invention will appear more fully hereinafter from consideration of the description which follows and of the accompanying drawing, wherein one embodiment of a type of apparatus suitable for carrying out the process is illustrated, and wherein apparatus features of the invention are shown. It is to be expressly understood, however, that the drawing and specific examples are for the purposes of illustration and description, and are not to be construed as defining the limits of the invention.

The contaminant in the core sample as taken from the ground may be either oil, such as crude petroleum, gasoline, or intermediates, or it may be salt water. The process is also effective in removing other liquid contaminants introduced during testing or treatment of the cores. When the contaminant is oil, the extracting liquid will advantageously be a solvent for that oil. Various solvents for different oils are in general used, and may be employed alone or in combination. For crude petroleum contaminant, toluene, pentane and carbon tetrachloride are among the effective solvents.

Although a solvent is generally much more effective, the oleaginous contaminants can also be removed by extraction liquids which are not solvents, but whose action is primarily mechanical. For instance, water may be used, and is effective in removing a large proportion of contaminant oil very rapidly. It also has the advantage of wetting the interior surfaces exposed by removal of oil, which is beneficial. However, the use of non-solvents is generally restricted to operations in which complete and thorough removal of the contaminants within a reasonable time is not required. Moreover, such partial removal by a non-solvent may be followed by removal of the residue with a solvent-extracting liquid, an arrangement which may result in economy of time and materials.

For many purposes an emulsifier will improve the process of extracting oil with a solvent. Many emulsifiers that are obviously suited for this purpose are known and may be used in the usual proportions. In general, it has been found that a proportion of about 2% of emulsifier is satisfactory, and not over 3% is required, these proportions being based on the volume of the solvent. Such emulsifiers must of course be soluble in the solvent and must be lipophilic. However, emulsifiers should not be used in cases where the sample under treatment is to be subjected to capillary tests after removal of the oil.

When the contaminant is salt water, this may be effectively removed in the indicated manner by using ordinary water as the extracting liquid.

The extraction is carried out by submerging the core in extracting liquid and subjecting the core to the action of ultrasonic waves passing through the liquid. This is conveniently accomplished in an ultrasonic cleaner of known type such as that disclosed in patent application Serial No. 405,756, Brown, filed January 25, 1954, now Patent No. 2,815,193. The cleaner will include a container for the solvent and core, and means for transmitting ultrasonic waves into the liquid. The wave frequency is not critical for general use, but a frequency between 15 kilocycles per second (15 kc.) and 60 kilocycles per second (60 kc.) will be effective, unexpectedly good results having been obtained at frequencies between 18 kc. and 22 kc.

The container is advantageously closed, and subjected to a series of pressure changes. This is effectively accomplished by reducing the pressure in the container below atmospheric pressure, and periodically raising the pressure therein, which may be done readily by opening a valve connection to the outer air. A suction line having a gas withdrawal rate less than the inward flow of air through the valve connection may be in continuous operation, so that the pressure changes can be produced simply by operating a single air intake valve. This arrangement is effective to withdraw through the suction line any solvent and oil vapors that may be inflammable or otherwise objectionable, and prevents them from reaching the outer air.

The pressure in the container is advantageously reduced to a value at which the extracting liquid boils. This value will depend both on the character of the liquid and on its temperature. It has been found to be practical to boil extracting liquid at room temperature, toluene, for instance, boiling at this temperature in a vacuum of about 26 inches of mercury. Extraction liquids at higher temperatures naturally boil at lower vacuum values, that is, at higher pressures less than atmospheric.

The lowered pressure is effective, as noted, to withdraw contaminating liquid from remote passages and interstices by a flushing action. It also cooperates with the ultrasonic waves by increasing cavitation and the resultant vigorous action in freeing the contaminant liquid from remote and very small spaces, as well as breaking the adsorptive hold of the stone surfaces on the entrapped oil.

It is generally desirable to change the extracting liquid when it collects a substantial amount of contaminants, either by continuous circulation or at intervals. The latter has proved successful with oil contaminants if the extracting liquid is replaced whenever it becomes perceptibly darker, and the operation is continued until no perceptible darkening takes place.

The effectiveness of the process where the contaminant is relatively viscous, such as crude oil, is improved by operation at temperatures above room temperature; and it has been found that heating the core sample under treatment to a temperature of about 160° F. prior to immersion in the extracting liquid is advantageous, since it expands the gases and liquids in the core and drives out to some extent the oil trapped in the core.

The drawing illustrates apparatus of the type described in detail in the above-mentioned application, together with auxiliary equipment adapted for carrying out a process embodying the method features of the invention. It is a somewhat diagrammatic vertical central section, with parts shown in elevation. The ultrasonic cleaner 10 comprises a body 11 enclosing a compartment 12 in which a container 13 is supported from its upper marginal portion, as by resting its outwardly flared rim 14 on the upper margin 15 of body 11. A magnetostrictive transducer 16 is fixed to the bottom of the container 13 in position to transmit ultrasonic waves to the container and to liquids within the container, and is immersed in cooling liquid 17 in the lower part of compartment 12. The parts described to this point are indicated more or less diagrammatically, since full details of one form of their construction and arrangement are given in the above-mentioned application.

A carrier for oil core samples is placed in container 13, which is filled with the extracting liquid to a level above the top of the core samples. In the form illustrated, a core carrier 18 of wire mesh which may contain a plurality of core samples 19 is placed in the container 13. It is provided with a foraminous bottom 20, which may be formed of woven nylon, advantageously spaced from the bottom of the container 13. The container is filled with extracting liquid 21 to a level 22 above cores 19.

An arrangement is provided for sealing the top of container 13, evacuating the container to the desired reduced pressure, and releasing the pressure at the proper time in the manner already described. This arrangement advantageously comprises an evacuation unit 23 which is adapted to be placed on the top of container 13 as a cover, being held in place in sealing engagement with the container by the reduced pressure. In the form illustrated, the unit 23 includes a cover plate 24 proportioned to extend across the entire top of container 13, and which advantageously is made of "Lucite" or other clear plastic material through which the contents of the container 13 may be observed. A flat gasket ring 25, which may be made of rubber, is bonded to the lower face of cover 24 in position to bear continuously against the rim 14 of container 12.

A source of reduced pressure is connected through the cover 24 to the interior of container 13. In the form illustrated, a fitting 26 is tightly threaded into an exhaust opening 27 to cover 24 and connected to a suction pipe 28 running to a vacuum pump 29. A valve 30, arranged to disconnect fitting 26 from the suction pump 29 and connected to the ambient air, is provided in pipe 28. One form of valve suitable for the purpose is diagrammatically illustrated. It comprises a valve head 31 fitting against an upper seat formed by cap 32, provided with vents 33 to the outside air closed by head 31. Valve stem 34 fixed to head 31 has mounted thereon a handle 35 for manual operation. A spring 36 bearing against the cap 32 and against a retainer plate 37 on stem 34 which may be retained by engagement with handle 35 maintains valve 30 in upper position, sealing vents 33 and leaving the suction passage unobstructed. Depression of handle 35 will shift valve head 31 into engagement with seat 38, cutting off the connection to suction pump 29 and connecting the interior of container 13 through fitting 26 and vents 33 to the open air. Upon release of handle 35, valve head 31 will be returned to upper position by spring 36, sealing the air openings and reconnecting the suction pump to the container 13.

An arrangement is advantageously provided for automatic operation of valve 30; and the unit may be arranged for operation either manually, automatically or alternatively in either way. In the form diagrammatically illustrated, this is accomplished by providing means for electrically operating valve 30, and means for energizing the electrical operating means when the vacuum in container 13 reaches the selected value. In the form shown, the operating element 40 comprises a casing 41 including a bottom section 42 connected through fitting 26 to the exhaust opening 27 and defining a vacuum chamber 43. A diaphragm 44 extends across the top of chamber 43 and is marginally clamped between the top of section 42 and a retaining plate 47 at the lower side of diaphragm 44 normally maintains the diaphragm in upper position. The top section 45 is provided with vents 48 to the outer air.

An operating rod 50 extends through diaphragm 44 and plate 47, which are fixed to it as by clamping nuts 51. Rod 50 is slidably mounted in the top casing section 45 and carries means for actuating the valve-operating electrical system at a predetermined degree of vacuum in container 13. In the form illustrated, this means comprises a collar 52 held in adjusted position on rod 50 as by set screw 53 in register with the normally open contacts 54 of a spring switch 55, which may be mounted on the top casing section 45. Switch 55 is connected in a circuit including a solenoid 56, arranged in register with valve stem 34, switch 55 and solenoid 56 being connected, in circuit with adjustable timer 57 and manual switch 58, to a source of electrical energy 59.

It will be noted that all of the working parts are mounted on cover plate 24. This type of arrangement is particularly convenient because it involves no modification of the cleaning apparatus, and facilitates ready operation of the process. After the loaded carrier 18 is placed in the liquid 21, the cover 24 is placed in position and vacuum pump 29 is started. When boiling commences, as observed through transparent cover 24, valve 30 is opened, allowing air to rush into container 13, and the valve is held open for a period sufficient to force the extracting liquid into the cores 19 and establish atmospheric pressure therein. This will vary under different conditions, of from 5 to 30 seconds having been found effective. While the arrangement illustrated provides for closing the connection to the vacuum pump 29 during intake of air, this is not essential, since it has been found practical to proportion the parts so that the vacuum pump may continue to operate during air intake, by providing vents 33 large enough to satisfy the intake requirements of the pump and still maintain substantially atmospheric pressure in container 13 while valve 30 is open, so that solvent vapors will not escape to the air but will be continuously carried off by the pump. This may be accomplished in the form shown by stopping the valve head 31 before it engages seat 38, so that fitting 26 is connected both to the pump 29 and the vents 33.

When valve 30 is closed, the pressure in container 13 is progressively reduced until the liquid 21 again boils, during which time the extracting liquid is drawn from the core pores, its flushing action being aided by the ultrasonic waves which travel through the liquid into the core, the implosion of the cavitation bubbles and the vaporizing of the solvent when the reduced pressure results in more boiling. It has been found that the pressure may advantageously be raised again when boiling is observed, and the cycle repeated. Transparent cover 24 permits the operator to observe the color of the liquid 21, and replace it with fresh extracting liquid when desirable. When the liquid 21 is no longer either visibly discolored or discolored under ultra-violet light (depending upon the desired degree of cleanliness), the vacuum pump 29 is cut off, valve 30 is opened and the unit 13 is removed.

When the automatic system is placed in operation by closing switch 58, as the vacuum in container 13 increases, the operating rod 50 will be progressively drawn down against the pressure of spring 46 until collar 52 engages switch 55 and closes contacts 54, energizing solenoid 56 and shifting valve 30 to connect container 13 through openings 27 and 33 to the outer air. As the pressure in container 13 rises, rod 50 will of course rise likewise, opening switch 55; but timer 57 will maintain the circuit through solenoid 56 for a predetermined period after switch 55 opens, sufficient to permit pressure in container 13 to rise to a desired point and be maintained at that point for a selected period of time, the timer 57 being of the adjustable period type so that it may be set to suit different conditions. After the selected period, timer 57 will open the circuit, releasing solenoid 56, and valve head 31 will return to upper position, cutting off the connection to the outer air and allowing vacuum pump 29 again to evacuate container 13. When this automatic system is in operation, after the vacuum required to boil the liquid in container 13 is determined and collar 52 is suitably positioned, and after timer 57 has been set for the time required to obtain the optimum efforts of pressure in container 13, the system will operate with a minimum of supervision, requiring only periodical check up. Cover plate 24 need not be transparent when the automatic operating system is employed.

The following are specific examples of the process:

*Example I*

Core samples 19 taken from the ground and containing crude oil are placed in carrier 18 and immersed in container 13 in an extraction liquid 21 comprised principally of toluene and containing 2% of an emulsifier known as "Atlas" G-8916-P, produced by Atlas Powder Company, Wilmington, Delaware, and described in the publication entitled "Atlas Surface Active Agent," copyright 1950, by said Atlas Powder Company, the emulsifier being a component of polyethylene sorbitan esters of mixed fatty and resin acids. The evacuation unit 23 is placed on container 13, and vacuum pump 29 is started. The evacuation and periodic vacuum relief cycle is carried on as already indicated, renewing the liquid 21 when it appears discolored, until discoloration substantially ceases. Pump 29 is stopped, valve 30 opened, unit 23 taken off and carrier 18 removed from the liquid.

*Example II*

Cores 19 containing salt water are placed in a carrier 18 immersed in the container 13 in water 21, the evacuation unit 23 is set in place and vacuum pump 29 is started. Valve 30 is opened when boiling is observed, and closed after a period depending upon the permeability of the cores under treatment. The extracting liquid 21 is changed periodically after testing it, as by tasting, to determine its salinity until it is substantially free from perceptible salt. The vacuum pump 29 is then stopped, valve 30 is opened, evacuation unit 23 removed and the cores 19 taken out.

While reference is made herein to ultrasonic waves, and certain ranges of waves above normally audible frequencies have been given, including a range found to be particularly advantageous, the invention in its broader aspects includes waves in the audible range, and particularly such waves having frequencies which are known to those skilled in the art as being useful for cleaning operations. However, although a limited number of examples of the process, and only one arrangement for carrying out said process, have been disclosed, it is to be expressly understood that the invention is not restricted thereto. Various changes can be made in the process and in the illustrated construction without departing from the spirit and scope of the invention as the same will now be understood by those skilled in the art.

I claim:

1. The method of extracting contaminants from a fluid-permeable body which comprises subjecting the body to the action of ultrasonic waves and simultaneously to a series of alternating higher and lower external fluid pressures.

2. The method of extracting contaminants from a liquid-permeable body which comprises immersing the body in liquid and subjecting the body to the action of ultrasonic waves and simultaneously to a series of alternating higher and lower pressures on said liquid.

3. The method of extracting contaminants from a liquid-permeable body which comprises immersing the body in liquid, subjecting the body to the action of ultrasonic waves, and simultaneously cyclically bringing the liquid to a boil and then terminating the boiling by an increase in pressure on said liquid.

4. The method of extracting oleaginous contaminants from an oil well core sample which comprises submerging the core sample in a liquid solvent of such contaminants and subjecting the sample to the action of cyclically changing pressures on said solvent.

5. The method of extracting contaminants including a liquid from an oil well core sample which comprises submerging the core sample in a liquid and subjecting the sample simultaneously to the action of cyclically changing pressures on the liquid and to ultrasonic waves.

6. The method of extracting contaminants from oil well core samples which comprises subjecting a core sample to the simultaneous action of a boiling solvent of such contaminants and of ultrasonic waves.

7. The method of extracting contaminants from oil well core samples which comprises subjecting a core sample to the simultaneous action of a boiling solvent of such contaminants and of ultrasonic waves transmitted through the solvent to the sample.

8. The method of extracting contaminants including a liquid from an oil well core sample which comprises submerging the core sample in a liquid and simultaneously cyclically reducing the pressure on the extracting liquid until the latter liquid boils, then increasing the pressure on said liquid to terminate the boiling, while subjecting the sample to the action of ultrasonic waves.

9. Ultrasonic fluid treatment apparatus comprising a closed fluid container, means engaging the container for transmitting ultrasonic waves to contents of the container, and means for simultaneously cyclically varying the pressure in the container.

10. Ultrasonic liquid treatment apparatus comprising a closed liquid container, means for transmitting ultrasonic waves to liquid in the container, and means for simultaneously cyclically varying the pressure on said liquid, including a source of reduced pressure and a separate source of higher pressure, both connected to the container.

11. Ultrasonic liquid treatment apparatus comprising a closed liquid container, means for transmitting ultrasonic waves to liquid in the container, a source of subatmospheric pressure connected to the upper part of the container, a passage connecting the upper part of the container with the ambient air, and a valve in said passage.

12. Ultrasonic liquid treatment apparatus comprising a closed liquid container, including a body having an open top and a separate cover extending across said top in sealing engagement therewith, said cover including a transparent area through which the liquid is visible, means for transmitting ultrasonic waves to liquid in the container, and means for cyclically varying the pressure in the container.

13. Ultrasonic liquid treatment apparatus comprising a closed liquid container, including a body having an open top and a transparent cover extending across and in sealing engagement with said top, means for transmitting ultrasonic waves to liquid in the container, a conduit extending through the cover in communication with the upper part of the container and arranged for connection to a source of subatmospheric air pressure, and a conduit extending through the cover from the upper part of the container to the ambient atmosphere, the latter conduit including a valve.

14. Ultrasonic fluid treatment apparatus comprising a fluid container having an open top, a source of ultrasonic waves in wave-transmitting association with the container, a removable cover for the container, and means for holding the cover in sealing engagement with the container by reduced pressure and for subjecting the fluid to reduced pressure, including a suction connection extending from the interior of the container through the cover to a source of reduced pressure.

15. Ultrasonic liquid treatment apparatus comprising a closed liquid container, means for transmitting ultrasonic waves to liquid in the container, and means for automatically cyclically varying the pressure in the container by connecting said container alternately to a source of lower pressure and a source of higher pressure, comprising means actuated by a reduction in container pressure to a predetermined value to connect the container to the source of higher pressure, and thereafter to reconnect the container to the source of lower pressure.

16. Ultrasonic liquid treatment apparatus comprising a closed liquid container, means for transmitting ultrasonic waves to liquid in the container, and means for automatically cyclically varying the pressure in the container by connecting said container alternately to a source of lower pressure and a source of higher pressure, comprising a normally closed valve connecting the container to the higher pressure source, means for opening the valve when the pressure in the container falls below a selected value, and means for keeping the valve open for a predetermined period after the container pressure rises above said value.

References Cited in the file of this patent

UNITED STATES PATENTS

| | | |
|---|---|---|
| 1,328,657 | Fish | Jan. 20, 1920 |
| 2,118,480 | Somes | May 24, 1938 |
| 2,527,666 | Winter | Oct. 31, 1950 |
| 2,554,701 | Hackett | May 29, 1951 |
| 2,608,391 | Seavey | Aug. 26, 1952 |
| 2,616,820 | Bourgeaux | Nov. 24, 1952 |
| 2,632,634 | Williams | Mar. 24, 1953 |
| 2,659,223 | Karcher | Nov. 17, 1953 |
| 2,733,667 | Hill | Feb. 7, 1956 |
| 2,734,518 | Harrison | Feb. 14, 1956 |
| 2,771,086 | Kearney | Nov. 20, 1956 |